Aug. 28, 1956 J. D. BANNING 2,761,015

PUSH BUTTON TELEPHONE NUMBER SELECTOR

Filed July 13, 1953

J. D. BANNING
INVENTOR.

BY Herbert J. Brown
ATTORNEY 2,761,015

PUSH BUTTON TELEPHONE NUMBER SELECTOR

Joe Doyle Banning, Fort Worth, Tex.

Application July 13, 1953, Serial No. 367,541

3 Claims. (Cl. 179—90)

This invention relates to improvements in automatic telephone number selectors, and has for its primary object the provision of a convenient push button construction in such devices.

Another object of the invention is to provide a telephone number selector having interchangeable parts, and whereby mass production is made possible even though the requirements of the individual telephone users vary as to frequently called numbers.

Another object of the invention is to provide a construction and arrangement whereby a frequently called number may be called by pressing a single button.

A further object of the invention is to provide a single button arrangement for ringing frequently called numbers, and at the same time providing an arrangement of integer buttons for selectively calling any number in a telephone directory.

These and other objects of the invention will become apparent from the following description and accompanying drawing, wherein.

Figures 1, 2, 3, 4, 5, 6:
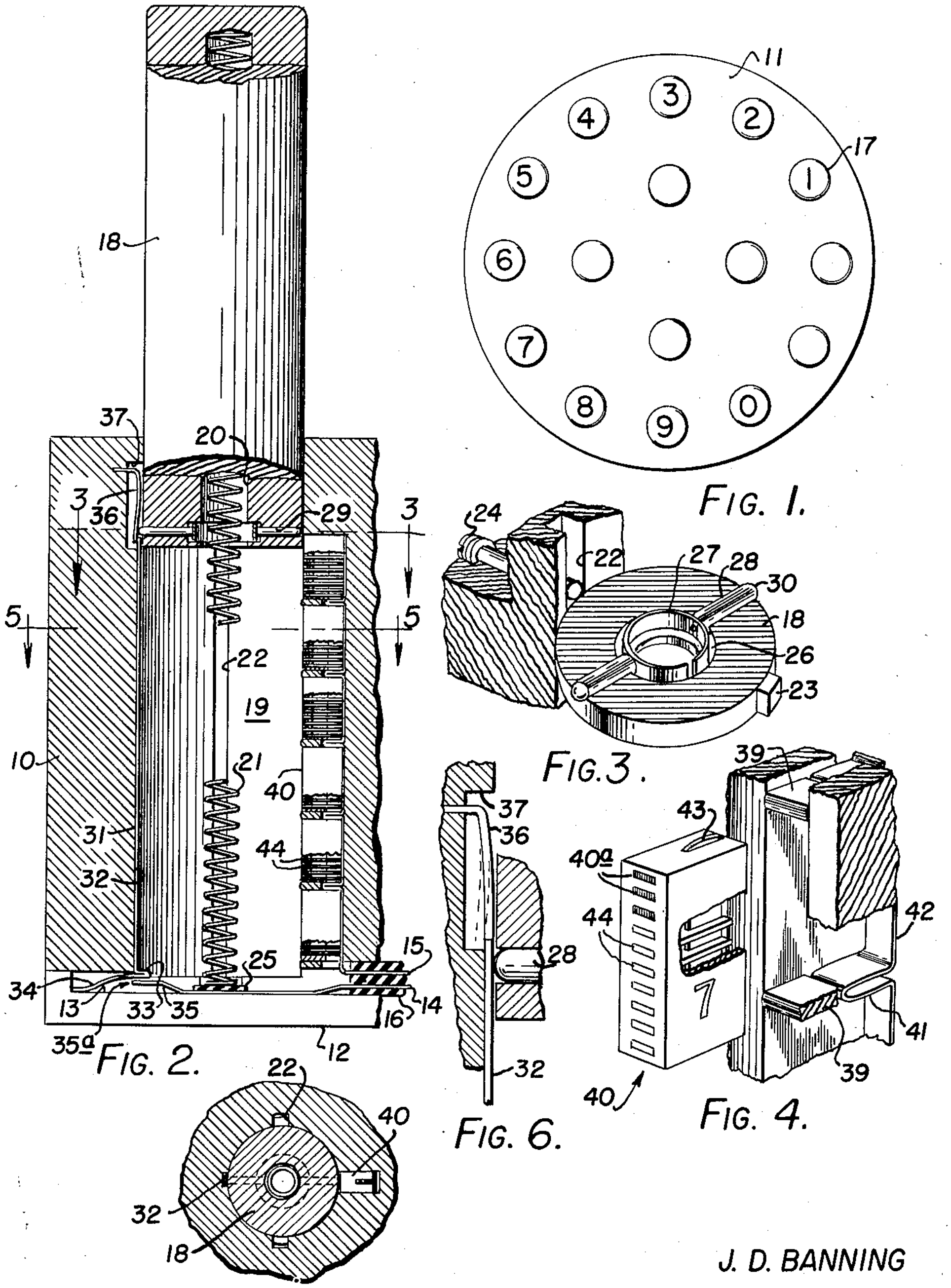
Figure 1 is a plan view of a case having an arrangement of push buttons therein in accordance with the invention.
Figure 2 is an enlarged broken vertical section of one of the push button assemblies comprising a typical unit.
Figure 3 is a further enlarged broken perspective and sectional view taken on line 3—3 of Figure 1.
Figure 4 is an enlarged broken perspective view showing one of the removable contact boxes adapted to be received within a recess in the wall of the button receiving bore.
Figure 5 is a broken sectional view taken approximately on line 5—5 of Figure 1.
Figure 6 is a broken vertical sectional view showing the locking arrangement for maintaining the primary switch in closed position.

The form of the invention shown includes a cylindrical case 10, a flat upper surface 11 forming a part thereof, and a removable base 12. It is to be understood that the case 10 may be of any desired shape, but is illustrated as round so as to conform with the dial design of a conventional telephone. A recess 13 is formed in the upper surface of the base 12 for receiving electrical leads 14 and 15 which form a part of the dialing or impulse circuit such as used in dial telephone systems. Insulation 16 is provided around the leads 14 and 15.

As shown in Figure 1, there are ten push buttons 17 arranged around the periphery of the case surface 11 and are numbered one through zero. Other buttons 18 are for calling a telephone number by a single operation, and which arrangement is shown in detail in Figure 2. The case 10 is provided with vertical bores 19 for slidably receiving the cylindrical push button 18, and which button includes an axial bore 20 in its lower end for receiving a compression spring 21. Opposing sides of the bore 19 are provided with vertical grooves 22 for slidably receiving laterally extending projections 23 on the lower end of the button 18. At least one set screw 24 extends into one of the grooves 22 for engaging the upper portion of the corresponding projection 23, thereby limiting the upward movement of the button 18 which is normally raised by the compression spring 21. An insulator 25 is positioned beneath the lower end of the spring 21. The base 12, the case 10, and the button 18 are of dielectric material.

An annular recess 26 in the axial bore 20 of the button 18, and located near the lower end of the latter, receives a split circular spring 27 having contact pins 28 secured to opposite sides thereof. The pins 28 are slidably mounted in openings 29 transversely located in the button 18, and the outer ends of the pins are round as at 30 for making sliding contact with electrical parts to be described. A vertical recess 31 in the button receiving bore slidably receives an elongated flat conducting member 32 having an inwardly directed reverse bend 33 formed in its lower end, together with an outwardly projecting leaf spring 34 on the lower end thereof and which spring contacts the upper surface of the recess 13 in the base 12. One of the electrical contacts 14 of the dialing circuit includes a spring contact 35 which extends beneath the spring insulator 25 and is positioned beneath the commutator bend 33 to provide switch 35*a*. A locking spring 36 is mounted in a recess 37 in the upper end of the case 10, and which spring is downwardly formed so as to fit against the outer upper end of the conducting member 32 when the latter is in its raised position. When the button 18 is completely depressed the same contacts the bend 33 of the switch 35*a*, moving the conducting member 32 downwardly and allowing the spring 36 to move inwardly against the surface of the button 18. When thus positioned, the lower end of the spring 36 engages the upper end of the conducting member 32, thereby holding the latter in its down position. When the button 18 returns to its upper position, the action of the spring loaded adjacent contact pin 28 moves the locking spring 36 outwardly, allowing the lower commutator spring 34 to move the commutator upwardly and away from the lower spring contact 35. The side of the bore 19 opposite the conducting member 32 is provided with a large vertical recess 38 extending from top to bottom, and which recess is provided with dielectric horizontal partitions 39 therein for receiving impulse contact boxes 40 therebetween. As shown in Figures 2 and 4, the partitions 39 are located near the surface or wall of the button receiving bore 19 so as to provide space behind the side partitions for receiving the U-shaped springs 41, and which springs are formed of a single length of a flat electrical contact 42 which is connected with one of the leads 15 of the referred to dielectric circuit.

Each box 40 is rectangular and is provided with a vertical bus bar 43 having extending outer ends for engagement and electrical contact with the upper and lower surfaces of the spaced U-shaped springs 41. The side of the box 40 adjacent the bore 19 is provided with ten openings 40*a* for exposing the ends of multiple contacts 44 connected with the bus bar 43. As shown in Figure 4, the upper three openings in box 40 do not include contacts 44, thus providing seven impulses during the operation of the button 18. The last referred to box 40 may be marked with the numeral 7 for identification, and other boxes may be similarly marked to indicate the number of contacts each contains.

Referring now to Figure 2, it will be seen that the lowermost box 40 includes two contacts, the box thereabove has four such contacts, the next thereabove has two such contacts, thence seven, thence four and seven. Accordingly, the return action of the button 18, by reason of the contact of the outer end of the adjacent pin 28 with the ends of these contacts will ring the telephone number 2–4–2–7–4–7.

The push buttons 17 identified by the integers one through zero include the same contact mechanism as described above, but each includes a single box 40 with a corresponding number of contacts 44. Thus, any combination of numbers may be selectively obtained by depressing the desired sequence of buttons 17.

In accordance with the present invention all boxes 44 are of the same size and the spacing of the partitions 39 and arrangement of U springs 44 are all correspondingly equal so that any desired arrangement of contacts 44 may be provided, and whereby the same may be conveniently installed to serve an individual user at the place of use.

The invention is not limited to the exemplary construction herein shown and described, but may be made in many ways within the scope of the appended claims.

What is claimed is:

1. In a telephone number selector, a case including a button receiving bore therein, a cylindrical button adapted to be slidably received within said bore, aligned multiple contacts within the wall of said bore and spaced from each other parallel with the bore axis, and a resilient contact carried by said button and arranged to slidably engage said multiple contacts.

2. In a telephone number selector as defined in claim 1, the construction wherein said resilient contact is comprised of a laterally disposed pin mounted within a lateral opening in said button, and including a spring within the said button bearing against the inner end of said pin.

3. In a telephone number selector as defined in claim 1, the construction wherein said multiple contacts are mounted in a box, and wherein said bore includes a recess in the side thereof for receiving said box.

References Cited in the file of this patent

UNITED STATES PATENTS

| | | |
|---|---|---|
| 1,451,328 | Desplats | Apr. 10, 1923 |
| 2,063,830 | Lobel | Dec. 8, 1936 |
| 2,391,911 | MacKenzie | Jan. 1, 1946 |
| 2,487,199 | Titcomb | Nov. 8, 1949 |
| 2,586,750 | Wagner | Feb. 19, 1952 |